(12) United States Patent
Tesanovic (10) Patent No.: US 12,396,024 B2
(45) Date of Patent: Aug. 19, 2025

(54) METHOD AND APPARATUS FOR RESOURCE SCHEDULING IN MULTI-HOP NETWORK

(71) Applicant: Samsung Electronics Co., Ltd., Gyeonggi-do (KR)

(72) Inventor: Milos Tesanovic, Middlesex (GB)

(73) Assignee: Samsung Electronics Co., Ltd (KR)

( * ) Notice: Subject to any disclaimer, the term of this patent is extended or adjusted under 35 U.S.C. 154(b) by 387 days.

(21) Appl. No.: 18/019,194

(22) PCT Filed: Jul. 30, 2021

(86) PCT No.: PCT/KR2021/009993
§ 371 (c)(1),
(2) Date: Feb. 1, 2023

(87) PCT Pub. No.: WO2022/030896
PCT Pub. Date: Feb. 10, 2022

(65) Prior Publication Data
US 2023/0292359 A1  Sep. 14, 2023

(30) Foreign Application Priority Data
Aug. 5, 2020 (GB) .................................. 2012198

(51) Int. Cl.
*H04W 72/563* (2023.01)
*H04W 40/28* (2009.01)
*H04W 72/542* (2023.01)

(52) U.S. Cl.
CPC ......... *H04W 72/563* (2023.01); *H04W 40/28* (2013.01); *H04W 72/542* (2023.01)

(58) Field of Classification Search
CPC ..... H04W 76/27; H04W 40/34; H04W 76/19; H04W 76/15; H04W 36/305;
(Continued)

(56) References Cited

U.S. PATENT DOCUMENTS

| 2014/0192638 A1 | 7/2014 | Taneja |
| 2019/0394823 A1 | 12/2019 | Jo et al. |
| 2020/0092784 A1 | 3/2020 | Hampel et al. |

FOREIGN PATENT DOCUMENTS

| EP | 2091292 | 8/2009 |
| GB | 2573554 | 11/2019 |

(Continued)

OTHER PUBLICATIONS

Huawei, "Some Considerations about Flow Control for IAB Networks", R2-1818071, 3GPP TSG-RAN WG2#104, Nov. 12-16, 2018, 4 pages.
(Continued)

*Primary Examiner* — Jung Liu
(74) *Attorney, Agent, or Firm* — The Farrell Law Firm, P.C.

(57) ABSTRACT

Provided is a method for resource scheduling in a network including a first node, a second node and a third node. The method comprises: receiving, from a third node, first information indicating downstream status; identifying an event associated with link quality reduction on a link between the second node and the third node based on the first information indicating downstream status; transmitting, to a first node, second information to report the identified event; receiving, from the first node, third information to handle the link quality reduction on the link between the second node and the third node; and determining an action for mitigating the link quality reduction based on the third information.

15 Claims, 4 Drawing Sheets

(58) Field of Classification Search
CPC . H04W 72/1268; H04W 40/22; H04W 92/20; H04W 92/045; H04W 76/18; H04W 76/11; H04W 80/08; H04B 7/15528; H04B 7/14; H04L 45/22; B60W 50/14
See application file for complete search history.

(56) References Cited

FOREIGN PATENT DOCUMENTS

| WO | WO 2019/242612 | 12/2019 |
| WO | WO 2020/048510 | 3/2020 |
| WO | WO 2020/059470 | 3/2020 |
| WO | WO 2020/069158 | 4/2020 |
| WO | WO 2020/141933 | 7/2020 |

OTHER PUBLICATIONS

European Search Report dated Oct. 20, 2023 issued in counterpart application No. 21854061.5-1215, 9 pages.
PCT/ISA/210, International Search Report dated Nov. 12, 2021 issued in counterpart application No. PCT/KR2021/009993, 3 pages.
PCT/ISA/237, Written Opinion dated Nov. 12, 2021 issued in counterpart application No. PCT/KR2021/009993, 4 pages.
Search and Examination Report dated Jan. 28, 2021 issued in counterpart application No. GB2012198.4, 9 pages.
LG Electronics Inc., "BH RLF reporting to IAB donor node", 3GPP TSG-RAN WG2 Meeting #106 R2-1907958 Reno, NV, USA, May 13-17, 2019 resubmission of R2-1905072, 2 pages.

METHOD AND APPARATUS FOR RESOURCE SCHEDULING IN MULTI-HOP NETWORK

PRIORITY

This application is a National Phase Entry of PCT International Application No. PCT/KR2021/009993, which was filed on Jul. 30, 2021, and claims priority to United Kingdom Application No. 2012198.4, which was filed on Aug. 5, 2020, the entire content of which is incorporated herein by reference.

TECHNICAL FIELD

Certain examples of the present disclosure provide methods, apparatus and/or systems for resource scheduling in a multi-hop network. For example, certain examples of the present disclosure provide methods, apparatus and/or systems for UpLink (UL) resource scheduling in a hop-by-hop Integrated Access and Backhaul (IAB) network within 3$^{rd}$ Generation Partnership Project (3GPP) 5th Generation (5G) New Radio (NR), and other NR-based relay networks.

BACKGROUND ART

To meet the demand for wireless data traffic having increased since deployment of 4$^{th}$ generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

There is disclosed a method for resource scheduling in a network including a first node, a second node and a third node. The method comprises: receiving, from a third node, first information indicating downstream status; identifying an event associated with link quality reduction on a link between the second node and the third node based on the first information indicating downstream status; transmitting, to a first node, second information to report the identified event; receiving, from the first node, third information to handle the link quality reduction on the link between the second node and the third node; and determining an action for mitigating the link quality reduction based on the third information.

BRIEF DESCRIPTION OF DRAWINGS

For a more complete understanding of the present disclosure and its advantages, reference is now made to the following description taken in conjunction with the accompanying drawings, in which like reference numerals represent like parts.

BEST MODE FOR CARRYING OUT THE INVENTION

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

According to one embodiment of the present disclosure, a method for resource scheduling in a network including a first node, a second node and a third node is provided. In one embodiment, the second node is a child node of the first node and the third node is a parent node of the first node. The method may include determining, by the first node, that a reduction of QoS has occurred, or is likely to occur, on a link between the first node and the second node and/or for a specific channel on a link between the first node and the second node; transmitting, by the first node to the third node, information based on the determined reduction and/or anticipated reduction of QoS; and determining, by the second or third node or both, an action for mitigating the reduction of QoS.

In one embodiment, the determining that a reduction of QoS has occurred or is likely to occur based on one or more of: —link status information inferred by the first node; —information indicating when the first node will be able to give UL grant to the second node; —information indicating the type of traffic on each of one or more channels between the first node and the second node; —information indicating the validity of data coming from the second node; —information indicating uplink grants received by the first node from the third node; and —information of impending and/or ongoing transmission from a child node of the first node other than the second node and/or UEs attaching directly to the first node.

In one embodiment, the link status information comprises one or more of: a channel quality feedback report from the second node (e.g. indicating that retransmissions may be required); and information indicating channel quality and/or load and/or congestion on a link downstream of the second node.

In one embodiment, the method further includes determining, by the first node, one or more channels that have, or will be given, priority; and transmitting, by the first node to the third node, information based on determined channels.

In one embodiment, the information based on the determined reduction of QoS is transmitted based on one or more of: using one or more MAC Control Elements (CEs); using one or more MAC CEs when reporting BSR; using one or more control RLC CEs; using a BAP layer packet; if an LCH is mapped to multiple SR configurations, using one or more of the SR configurations for indicating a request for treatment modification; and if multiple grants are allowed for an LCH, using one or more of the grants for indicating a request for treatment modification.

In one embodiment, the information based on the determined reduction of QoS comprises one or more of: information indicating one or more channels requiring action for mitigating the reduction in QoS; and information indicating the type of action to perform for each channel.

In one embodiment, the information indicating the type of action includes a value indicating one or more of: "expedite grant", "increase reliability", and "do nothing".

In one embodiment, the action for mitigating the reduction in QoS comprises one or more of: modifying existing LCP parameters for UL data transfer from the first node; providing reserved resources for allowing scheduling without any requests from the first node; limiting the use of certain grants to certain LCHs; modifying one or more physical layer parameters; re-routing data once received; sending feedback to the network; and imposing restrictions on a node.

In one embodiment, the modifying the existing LCP parameters comprises giving higher priority to cannels where a delay is expected on the link between the first and second nodes.

In one embodiment, the information based on the determined reduction of QoS comprises information indicating channels where traffic should be dropped.

In one embodiment, the information indicating channels where traffic should be dropped is determined based on one or more of: —information regarding the first node's time-to-grant for the traffic; and —information regarding the number of hops that data from the second node needs to traverse in order to reach its destination.

According to one embodiment of the present disclosure, a method, for a first node, for resource scheduling in a network including the first node, a second node and a third node is provided. In one embodiment, the second node is a child node of the first node and the third node is a parent node of the first node. The method may include determining, by the first node, that a reduction of QoS has occurred, or is likely to occur, on a link between the first node and the second node and/or for a specific channel on a link between the first node and the second node; and transmitting, by the first node to the third node, information based on the determined reduction and/or anticipated reduction of QoS.

According to one embodiment of the present disclosure, a system for resource scheduling in a network, the system comprising a first node, a second node and a third node is provided. In one embodiment, the second node is a child node of the first node and the third node is a parent node of the first node. The first node is configured to: determine that a reduction of QoS has occurred, or is likely to occur, on a link between the first node and the second node and/or for a specific channel on a link between the first node and the second node, and transmit, to the third node, information based on the determined reduction and/or anticipated reduction of QoS, and wherein the second node or the third node or both are configured to determine an action for mitigating the reduction of QoS.

According to one embodiment of the present disclosure, a first node, for resource scheduling in a network including the first node, a second node and a third node is provided. In one embodiment, wherein the second node is a child node of the first node and the third node is a parent node of the first node, wherein the first node is configured to: determine that a reduction of QoS has occurred, or is likely to occur, on a link between the first node and the second node and/or for a specific channel on a link between the first node and the second node; and transmit, to the third node, information based on the determined reduction and/or anticipated reduction of QoS.

According to another embodiment of the present disclosure, a method, performed by a second node, in a wireless communication system is provided. The method may include receiving, from a third node, first information indicating downstream status; identifying an event associated with link quality reduction on a link between the second node and the third node based on the first information indicating downstream status; transmitting, to a first node, second information to report the identified event; receiving, from the first node, third information to handle the link quality reduction on the link between the second node and the third node; and determining an action for mitigating the link quality reduction based on the third information.

In one embodiment, the first information indicating downstream status comprises at least one of information indicating channel quality, information indicating load, or information indicating congestion on the downstream link of the third node.

In one embodiment, the action for mitigating the link quality reduction comprises at least one of action for modifying existing Logical Channel Prioritization (LCP) parameters for uplink data transfer from the second node; or action for re-routing data once received.

In one embodiment, the action for modifying existing LCP parameters for uplink data transfer from the second node comprises: at least one of action for adjusting scheduling weights; or action for giving higher priority to channels where a delay is expected on the link between the second node and the third node; and the action for re-routing data once received comprises action for re-routing the data through a less congested route.

In one embodiment, wherein the first node is a parent node of the second node; and wherein the third node is a child node of the second node.

In one embodiment, the event associated with link quality reduction on the link between the second node and the third node comprises at least one of: an event of link quality reduction occurred on at least one of the link between the second node and the third node, a second link between the third node and a child node of the third node, or a third link between child nodes of the third node; an event of link quality reduction to be likely to occur on at least one of the link between the second node and the third node, a second link between the third node and a child node of the third node, or a third link between child nodes of the third node; an event of QoS (Quality of Service) reduction occurred on at least one of the link between the second node and the third node, a second link between the third node and a child node of the third node, or a third link between child nodes of the third node; or an event of QoS (Quality of Service) reduction to be likely to occur on at least one of the link between the second node and the third node, a second link between the third node and a child node of the third node, or a third link between child nodes of the third node.

In one embodiment, the first information indicating downstream status comprises downstream link quality measurement information.

According to another embodiment of the present disclosure, a second node in a wireless communication system is provided. The second node may include a transceiver; and at least one processor configured to: control the transceiver to receive, from a third node, first information indicating downstream status, identify an event associated with link quality reduction on a link between the second node and the third node based on the first information indicating downstream status, control the transceiver to transmit, to a first node, second information to report the identified event, control the transceiver to receive, from the first node, third information to handle the link quality reduction on the link between the second node and the third node, and determine an action for mitigating the link quality reduction based on the third information.

According to one embodiment of the present disclosure, a computer program comprising instructions which, when the program is executed by a computer, cause the computer to carry out a method according at least one method of the above methods is provided.

According to one embodiment of the present disclosure, a computer-readable data carrier having stored thereon a computer program according to at least one method of the above methods is provided.

The present disclosure is defined in the independent claims. Advantageous features are defined in the dependent claims.

Embodiments or examples disclosed in the description and/or figures falling outside the scope of the claims are to be understood as examples useful for understanding the present disclosure.

Other aspects, advantages, and salient features of the disclosure will become apparent to those skilled in the art from the following detailed description taken in conjunction with the accompanying drawings.

MODE FOR THE INVENTION

FIG. 1 through FIG. 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

In 3$^{rd}$ Generation Partnership Project (3GPP) 5th Generation (5G) New Radio (NR), Integrated Access and Backhaul (IAB) is a technique for providing wireless backhaul as an alternative to a fibre backhaul network. An IAB network includes IAB nodes, at which wireless resources are shared between wireless backhaul and access links. Due to the use of the mmWave spectrum, and consequentially the limited coverage area of an IAB node, the backhaul network is typically implemented as a multi-hop network with backhaul traffic traversing multiple IAB nodes. The IAB nodes have a childparent node relationship.

In an IAB network, transmission delays can occur on links between adjacent IAB nodes. For example, on the UpLink (UL), the requirement to allocate resources for backhaul traffic between adjacent IAB nodes can result in transmission delay, which typically increases with an increasing number of hops.

To mitigate transmission delays, NR IAB Rel-16 introduced pre-emptive scheduling, in which an IAB node may request allocation of UL resources before it actually receives the data to be transmitted using the requested resources. In particular, an IAB node may pre-emptively allocate UL resources based on a Buffer Status Report (BSR) received from an adjacent child node. However, the status of nodes and links further downstream are not considered.

What is desired is an improved technique for resource scheduling resources in a multi-hop network, and in particular a technique for UL resource scheduling in a hopby-hop IAB network within 3GPP 5G NR, and other NR-based relay networks.

The above information is presented as background information only to assist with an understanding of the present disclosure. No determination has been made, and no assertion is made, as to whether any of the above might be applicable as prior art with regard to the present disclosure.

Certain examples of the present disclosure provide methods, apparatus and/or systems for resource scheduling in a multi-hop network. The following examples are applicable to, and use terminology associated with, 3GPP 5G. For example, certain examples of the present disclosure provide methods, apparatus and/or systems for UL resource scheduling in a hop-by-hop IAB network within 3GPP 5G NR, and other NR-based relay networks. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of an IAB node in the examples below may be applied to any other suitable type of entity performing functions of a network node.

The skilled person will appreciate that certain examples of the present disclosure may not be directly related to standardization but rather proprietary implementation of some of the Integrated Access and Backhaul (IAB) functions.

The skilled person will appreciate that the present disclosure is not limited to the specific examples disclosed herein. For example:

- The techniques disclosed herein are not limited to 3GPP 5G.
- One or more entities in the examples disclosed herein may be replaced with one or more alternative entities performing equivalent or corresponding functions, processes or operations.
- One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g. a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

To satisfy extremely high data rate requirements, the 3GPP 5G NR standard utilizes communication frequencies in a relatively high range, from 30 GHz to 300 GHz, corresponding to wavelengths in the millimeter (mm) range (mmWave communication). Such mmWave communication provides a large available bandwidth and high transmission speeds. However, problems with mmWave communication include severe signal path loss and low penetration, resulting in a relatively short transmission range. This in turn requires a greater density of base stations deployment.

Due to the relatively high cost and other difficulties associated with deployment of fibre transport network links, wireless backhauling can be used as an alternative. Integrated Access and Backhaul (IAB), in which a part of the radio resources is used for backhauling, is currently being standardized for 3GPP Rel-16.

According to 3GPP TR 38.874 (e.g. V16.0.0, 2018-12), the backhaul architecture is expected to support multi-hop backhauling in which backhaul traffic is wirelessly relayed by network nodes via one or more hops using mmWave communication. Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

Also according to TR 38.874, IAB strives to reuse existing functions and interfaces defined for access. In particular, Mobile-Termination (MT), gNB-DU (Distributed Unit), gNB-CU (Central Unit), UPF (User Plane Function), AMF (Access and Mobility management Function) and SMF (Session Management Function) as well as the corresponding interfaces NR Uu (between MT and gNB), F1, NG, X2 and N4 are used as baseline for the IAB architectures.

The Mobile-Termination (MT) function has been defined as a component of the Mobile Equipment, and is referred to as a function residing on an IAB-node that terminates the radio interface layers of the backhaul Uu interface toward the IAB-donor or other IAB-nodes.

Figure 1:
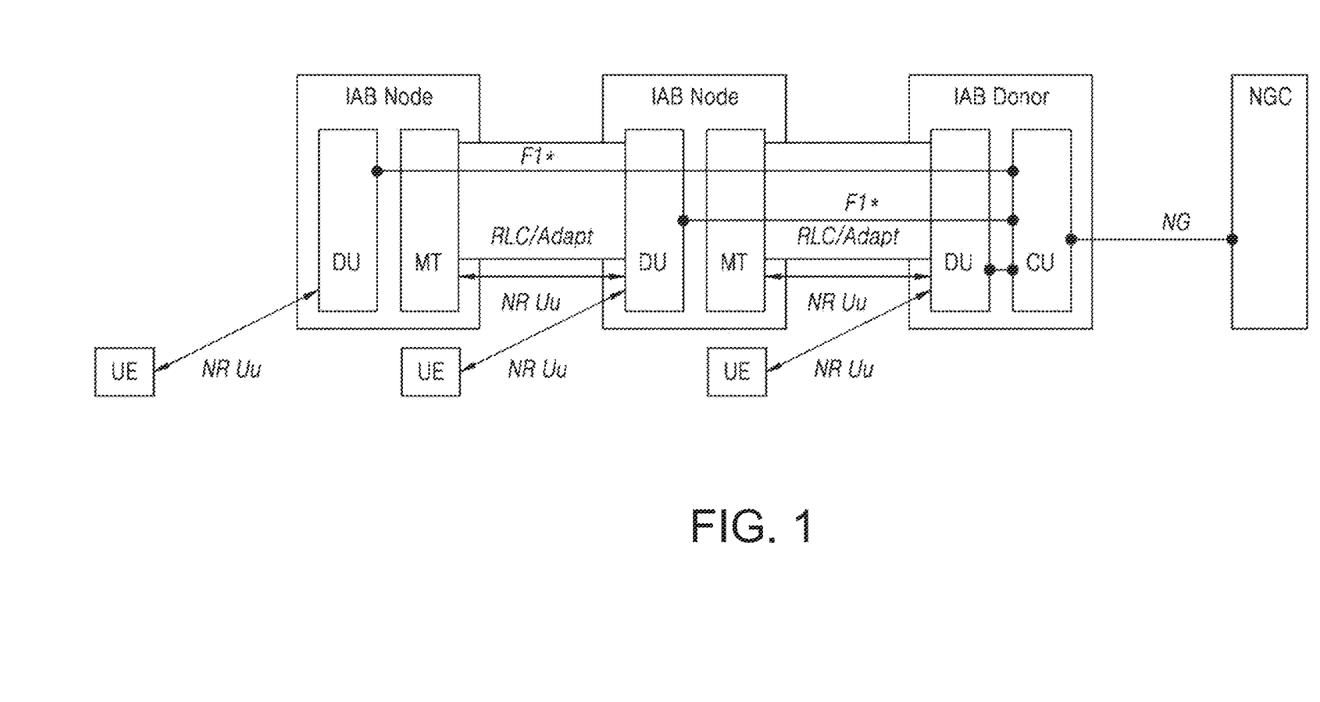
FIG. 1 illustrates one example architecture for multi-hop backhauling according to embodiments of the present disclosure.

FIG. 1 illustrates one example architecture for multi-hop backhauling according to embodiments of the present disclosure.

As defined in TR 38.874, the architecture for multi-hop backhauling shows the reference diagram for a two-hop chain of IAB-nodes underneath an IAB-donor, where IAB-node and UE connect in standalone (SA)-mode to an NGC (Next Generation Core).

An IAB-node may be defined as a RAN(Radio Access Network) node that supports wireless access to UEs and wirelessly backhauls the access traffic. An IAB-donor may be defined as a RAN node which provides UE's interface to core network and wireless backhauling functionality to IAB-nodes.

The architecture of FIG. 1 leverages CU/DU-split architecture. That is, the IAB donor node includes a Central Unit (CU) and one or more Distributed Units (DUs), with an interface called F1 between the CU and the one or more DUs. The functionality of the IAB donor is divided between the CU (hosting Radio Resource Control (RRC), Service Data Adaption Protocol (SDAP) and Packet Data Conversion Protocol (PDCP), and which terminates the F1 interface connected with the DU) and DU (hosting Radio Link Control (RLC), Medium Access Control (MAC) and Physical (PHY) layers, and which terminates the F1 interface with the CU) logical nodes. The internal structure (CU/DU) of the IAB donor is not visible to other nodes and the 5G core network (5GC). See 3GPP TS 38.401 (e.g. version 15.2.0, Release 15).

In the architecture of FIG. 1, each IAB-node holds a DU and an MT. Via the MT, the IAB-node connects to an upstream IAB-node or the IAB-donor. Via the DU, the IAB-node establishes RLC-channels to UEs and to MTs of downstream IAB-nodes. For MTs, this RLC-channel may refer to a modified RLC*. An IAB-node can connect to more than one upstream IAB-node or IAB-donor DU. The IAB-node may contain multiple DUs, but each DU part of the IAB-node has F1-C (F1 Control plane interface) connection only with one IAB-donor CU-CP (Control Plane).

The donor also holds a DU to support UEs and MTs of downstream IAB-nodes. The IAB-donor holds a CU for the DUs of all IAB-nodes and for its own DU. It is assumed that the DUs on an IAB-node are served by only one IAB-donor. This IAB-donor may change through topology adaptation. Each DU on an IAB-node connects to the CU in the IAB-donor using a modified form of F1, which is referred to as F1*. F1*-U (F1* User plane interface) runs over RLC channels on the wireless backhaul between the MT on the serving IAB-node and the DU on the donor. An adaptation layer is added —named Backhaul Adaptation Layer, or BAP, in the ongoing normative phase—which performs bearer mapping and routing. It replaces the IP functionality of the standard F1-stack. F1*-U may carry a GTP-U (General Packet Radio System (GPRS) Tunnelling Protocol for the user plane) header for the end-to-end association between CU and DU.

The Uu interface represents the interface between the UE and the DU in an IAB node. The F1* interface represents the interface between the IAB DU and an upstream CU.

As noted above, transmission delays between IAB nodes can occur, for example due to a resource allocation procedure. In a multi-hop network, delays are likely to accumulate due to number of hops and aggregated volume of data at IAB nodes.

Figure 2:
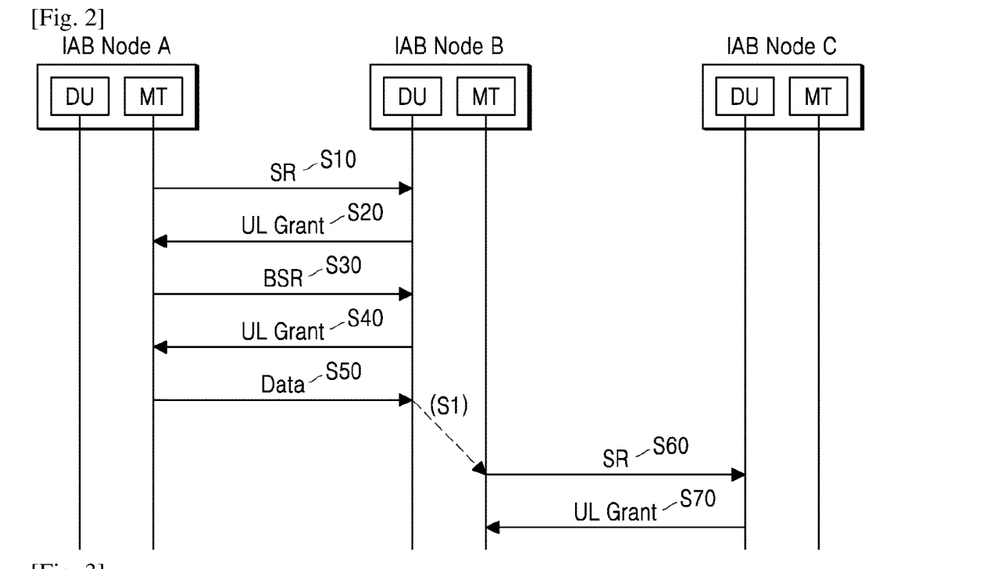
FIG. 2 illustrates a multi-hop network in which data delays may occur according to embodiments of the present disclosure.

FIG. 2 illustrates a multi-hop network in which data delays may occur according to embodiments of the present disclosure.

For example, in one scenario in the network of FIG. 2, neither of the nodes A or B may have any UL resource currently allocated to them. Since no UL resources are currently allocated, IAB node A transmits a scheduling request (SR) to IAB node B in Step S10. In response to the SR, IAB node B transmits an UL Grant (allocating resources) to IAB node A in Step S20. IAB node A uses the allocated resources to transmit a BSR to IAB node B in Step S30. In response to the BSR, IAB node B transmits a further UL Grant (allocating further resources based on the BSR) to IAB node A in Step S40. UAB node A then uses the further allocated resources to transmit data in Step S50. The preceding process can be repeated for transmission between IAB node B and IAB node C. The time required to perform the resource allocation procedure between each pair of adjacent nodes can increase the transmission delay.

According to one embodiment of the present disclosure, pre-emptive scheduling has the potential to reduce delays significantly. With reference to FIG. 1, the MT part of an IAB node can currently request uplink resources for the UL data transmission not only after it actually receives the data to be transmitted from its child node, but also before it receives actual data, as it may already have knowledge of incoming data from the child node based on a received BSR.

As noted above, an IAB node may pre-emptively allocate UL resources to an adjacent child node based on a Buffer Status Report (BSR) received from the child node. However, the status of nodes and links further downstream are not considered in the resource allocation or scheduling, which can reduce overall network performance.

In certain examples of the present disclosure, resources may be allocated or scheduled by a first node based not only on information concerning the status of an immediate child node of the first node (a second node) or link thereof, but also on information concerning the status of one or more child nodes further downstream (a third node, etc.) or links thereof. The provided information may allow the first node to determine downstream links, or channels on specific downstream links, where degradation or delays are occurring or are likely to occur. These links may include not only a link having the first node as an endpoint (e.g. a link between the first and second nodes), but also one or more links further downstream that do not have the first node as an endpoint (e.g. a link between the second and third nodes). The provided information may allow the first node to determine the type of degradation on the links.

Various aspects of certain examples of the present disclosure include the content of the information, the manner and/or circumstances in which the information is provided or reported, and the action that a node may take in response to the information. For example, certain exemplary aspects may concern one or more of the following.

Reporting, by a node to its parent node, of backhaul links to its own child nodes where degradation occurs or is estimated/anticipated/predicted to occur, and the type of degradation.

Reporting, by a node to its parent node, of channels (on specific links) that will experience delay or whose transmission is brought forward.

The ways in which this reporting can be done.

Limits imposed on the use of grants given by the parent node as a result and related restrictions imposed by the node in question.

Various examples of these aspects are described further below.

Figure 3:
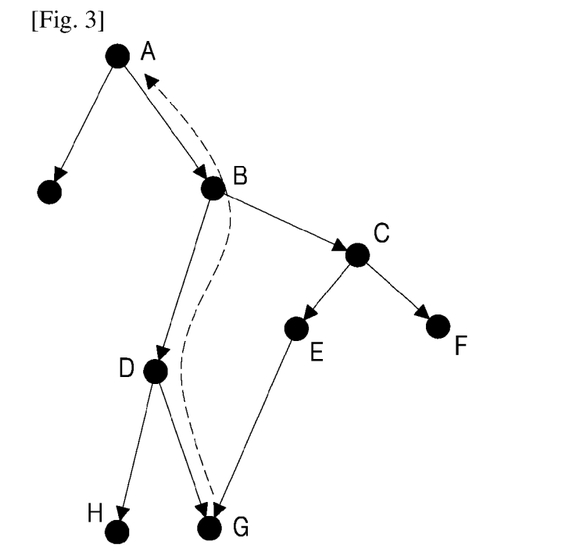
FIG. 3 is a diagram illustrating the parent/child node relationship in a multi-hop network according to embodiments of the present disclosure.

FIG. 3 is a diagram illustrating the parent/child node relationship in a multi-hop network according to embodiments of the present disclosure.

Referring to FIG. 3, the multi-hop network may include nodes A-H. In certain examples of the present disclosure, a node may experience QoS degradation on links to its own child node(s) and may flag relevant backhaul channels where this degradation is incurred (e.g. delay) to its parent node, which in turn adjusts its scheduling tactics in anticipation of the traffic coming its way on appropriate channels.

As an example, node D in FIG. 3 may determine that the information from node G on certain logical channels will be delayed and may report this to node B. In certain examples, the determination may be based on one or more of:

Link status (e.g. quality of sounding reference signals sent by node G to node D indicating potential issues with UL transmissions being received correctly at node D; frequent retransmissions; transmission failures; RLF (Radio Link Failure) reports send from node G to node D; link load e.g. how close it is to maximum capacity)

Link status further downstream (e.g. channel quality measured in ways including those described herein and/or load and/or congestion on links from node G to its child nodes and UEs)

Knowledge at node D of when it will be able to give UL grant to node G

Knowledge at node D of the type of traffic of each of the channels (for example, delays may be more critical for some applications than for others)

Knowledge at node D of the validity of data coming from node G (for example, given by time stamps contained in data packets, and/or the number of hops the data has already traversed, and/or the maximum/desired number of hops the data should traverse)

Knowledge at node D of own uplink grants (received from node B) and estimate (based on timing and size of those, and resource requests from node G) of the service it can provide to node G Knowledge at node D of impending or ongoing UL transmissions from its other child nodes (e.g. node H) and/or UEs attaching directly to node D In certain examples, node D may also report channels which should be given priority by node B (e.g. by reconfiguring LCP (Logical Channel Prioritization) parameters at node B), if node D determines that relevant traffic transmission will be precipitated from its child nodes.

In certain examples, the reporting may be done:
Explicitly
Using new MAC Control Element (CE) which may flag channels requiring treatment modification, for example as a binary map (e.g. "expedite grant"/"do nothing"), or a map with more quantization levels ("delay critical, expedite grant"/"delay non-critical, increase reliability"/"do nothing")
Modifying existing MAC CEs, for example when reporting BSR, flag the LCG(s)(Logical Channel Group(s)) which need different treatment (e.g. one way of doing this is using one of existing reserved bits in the BSR MAC CE or Pre-emptive BSR MAC CE)
Using new control RLC CEs
Using the BAP (routing) layer
Implicitly
If a LCH (Logical Channel) is mapped to multiple SR configurations, using one of those indicates a request for treatment modification
If multiple grants are allowed for a LCH, using one of those indicates a request for treatment modification In certain examples, node B in the example of FIG. 3 may then take one or more of the following actions:
Modify existing LCP parameters for UL data transfer from node D (e.g. give higher priority to channels where delay is expected on the D-G link)
Provide reserved resource (e.g. configured grant) to ensure scheduling can be done without any requests from node D
Limit use of certain grants to certain LCHs (e.g. limit use of configured grants to only certain LCHs; prioritize among types of grants for certain LCHs where multiple grants could be used; ban use of certain types of grants for certain LCHs)
Modify physical layer parameters (such as modulation and coding to be used for specific grants, number of antennas, type of beamforming/prohibit beamforming, type of MIMO scheme used)
Reroute data once received (e.g. through a less congested/fewer-hops route)
Send feedback to the network (e.g. the CU) with information received FIG. 4 is a flow chart of an example according to embodiments of the present disclosure.

Figure 4:
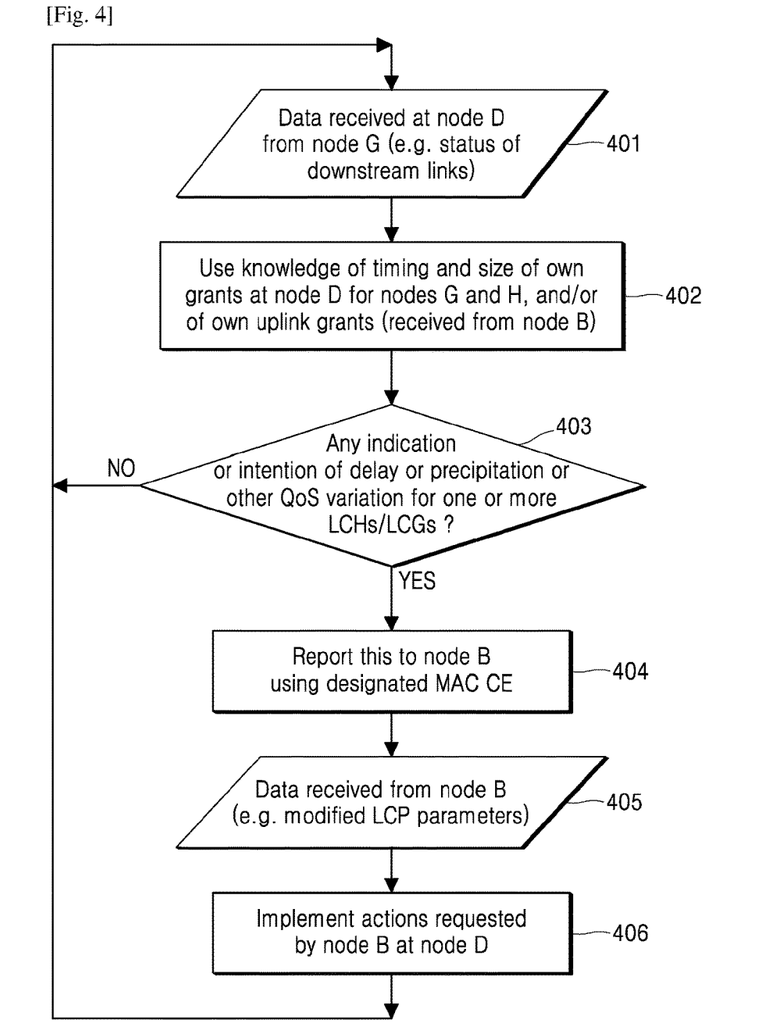
FIG. 4 is a flow chart of an example according to embodiments of the present disclosure.

Referring to FIG. 4, in an operation 401, data may be received at a second node (e.g., node D of Figured 3) from a third node (e.g., node G of Figured 3). The data may indicate, for example, the status of downstream links and/or nodes.

In an operation 402, the second node (e.g., node D of FIG. 3) may determine resource allocation and/or scheduling granted by node D to its immediate child nodes (e.g., the third node, node G and node H of FIG. 3). For example, referring to Figured 3, node D may determine timing and size of its own grants at node D for nodes G and H. Additionally or alternatively, the second node (e.g., node D of FIG. 3) determines resource allocation and/or scheduling granted to the second node (e.g., node D of FIG. 3) by its immediate parent node (e.g., first node, node B of FIG. 3). For example, the second node (e.g., node D of FIG. 3) may determine timing and size of its own uplink grants (received from the first node (e.g., node B of FIG. 3)).

In an operation 403, based on the determining performed in operation 402, the second node (e.g., node D of FIG. 3) may determine whether or not there is, or is predicted to be, any delay or precipitation in data transmission, or any other variation in QoS, on certain links and/or channels and/or at certain nodes (e.g. nodes D, H and G of FIG. 3 and links between them). For example, the second node (e.g., node D of FIG. 3) may determine whether or not there is any indication or intention of delay or precipitation or other QoS variation for one or more LCHs/LCGs. If not then then flow returns to the operation 401, otherwise the flow proceeds to an operation 404.

In the operation 404, the information determined in operation 403 may be reported to the first node (e.g., node B of FIG. 3). For example, the information may be reported using a designated MAC CE.

In an operation 405, the second node (e.g., node D of FIG. 3) may receive data from the first node (e.g., node B of FIG. 3). The received data allows the second node (e.g., node D of FIG. 3) to take actions to best handle the delay or precipitation in data transmission, or other variation in QoS, determined in the third operation 403. The data is determined by node B based on the information reported in the fourth operation 404. For example, the data may include modified LCP parameters.

In an operation 406, actions requested by the first node (e.g., node B of FIG. 3) are implemented at the second node (e.g., node D of FIG. 3).

In certain examples of the present disclosure, the second node (e.g., node D of FIG. 3) may flag channels where traffic should be dropped, for example since the delay will exceed a certain requirement and the data is deemed of no use to the destination node. In certain examples, the determination may be made based on one or more of the following:
Knowledge of own time-to-grant for this traffic
Knowledge of hops that data from node G needs to traverse in order to reach its destination In certain examples, the UL data from the third node (e.g., node G of FIG. 3) may be received by the DU part of the second node (e.g., node D of FIG. 3) and then internally shared with the MT part of the second node (e.g., node D of FIG. 3). In another example, link/channel status or inferences on link/channel status may be received or made by the DU part of the second node (e.g., node D of FIG. 3) and then internally shared with the MT part of the second node (e.g., node D of FIG. 3). Reporting by the second node (e.g., node D of FIG. 3) as described above may be done based on logical channels (LCHs) and/or their grouping into LCH groups (LCGs) at the MT part of the second node (e.g., node D of FIG. 3). In this case, a mapping may be defined between ingress LCHs of the MT part and egress LCHs of the collocated DU part. Mapping between egress and ingress LCHs may be set by the CU. The CU may not know the local status of links and buffers. Accordingly, certain examples of the present disclosure include an IAB network where the reports and subsequent or planned actions may be shared with the CU. The CU may then use these reports to modify the mapping between ingress and egress channels of certain nodes, modify routing tables in at least part of the network, prioritize certain routes over others, prioritize certain backhaul channels over others, modify topology of part of the network by making new connections or removing existing connections between nodes etc.

In certain examples, knowledge of hops may be determined based on designated information included in the MAC header. It may also be made based on exchange between BAP/MAC layers.

In certain examples, in the UL, mapping from ingress to egress channels may be configured by CU and the CU may not have any time-stamp information. If local decision-making is possible, a node may decide which of the allowed routes traffic should take based on delay incurred thus far. In certain examples, a packet may come with an expiry time on MAC and/or BAP layer, and/or with a number of hops it needs to traverse to a destination.

Figure 5:
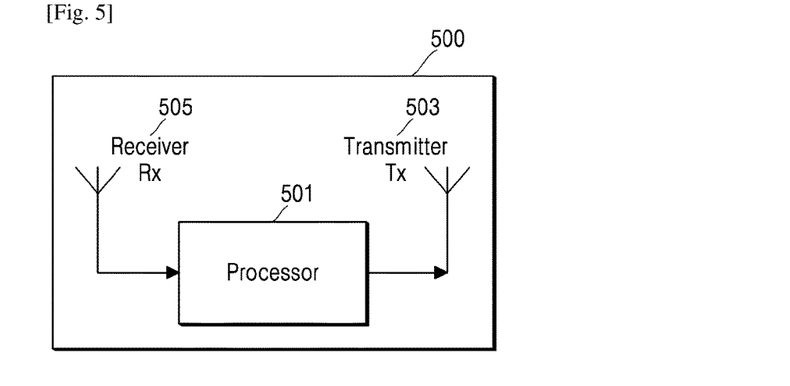
FIG. 5 is a block diagram of an exemplary network entity according to embodiments of the present disclosure.

FIG. 5 is a block diagram of an exemplary network entity (e.g. IAB Node or IAB Donor) according to embodiments of the present disclosure. The skilled person will appreciate that the network entity illustrated in FIG. 5 may be implemented, for example, as a network element on a dedicated hardware, as a software instance running on a dedicated hardware, or as a virtualized function instantiated on an appropriate platform, e.g. on a cloud infrastructure.

The entity 500 may include a processor (or controller) 501, a transmitter 503 and a receiver 505. However, all of the illustrated components are not essential. The entity 500 may be implemented by more or less components than those illustrated in FIG. 5. In addition, the processor 501 and the transmitter 503 and the receiver 505 may be implemented as a single chip according to another embodiment. The aforementioned components will now be described in detail.

The receiver 505 is configured for receiving one or more messages from one or more other network entities. The transmitter 503 is configured for transmitting one or more messages to one or more other network entities. The receiver 505 and transmitter 503 may be connected to the processor 501 and transmit and/or receive a signal. The signal may include control information and data. In addition, the receiver 505 may receive the signal through a wireless channel and output the signal to the processor 501. The transmitter 503 may transmit a signal output from the processor 501 through the wireless channel.

The processor 501 may include one or more processors or other processing devices that control the proposed function, process, and/or method. Operation of the entity 500 may be implemented by the processor 501. The processor 501 is configured for performing operations as described above.

The entity 500 may further include a memory. The memory may store the control information or the data included in a signal obtained by the entity 500. The memory may be connected to the processor 501 and store at least one instruction or a protocol or a parameter for the proposed function, process, and/or method. The memory may include read-only memory (ROM) and/or random access memory (RAM) and/or hard disk and/or CD-ROM and/or DVD and/or other storage devices.

Figure 6:
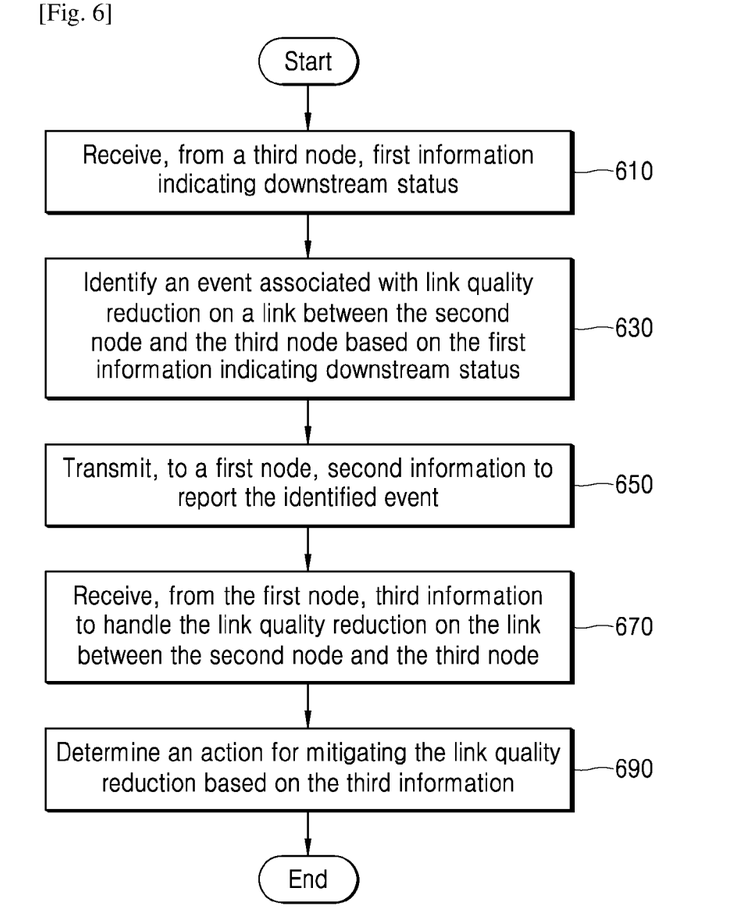
FIG. 6 is a flow chart of an example according to embodiments of the present disclosure.

FIG. 6 is a flow chart of an example according to embodiments of the present disclosure.

Referring to FIG. 6, in operation 601, a second node may receive, from a third node, first information indicating downstream status. The third node may be a child node of the second node. In one embodiment, the first information indicating downstream status may include at least one of information indicating channel quality, information indicating load, information indicating congestion on the downstream link of the third node, or downstream link quality measurement information.

In operation 603, the second node may identify an event associated with link quality reduction on a link between the second node and the third node based on the first information indicating downstream status. In one embodiment, the event associated with link quality reduction on the link between the second node and the third node comprises at least one of: an event of link quality reduction occurred on at least one of the link between the second node and the third node, a second link between the third node and a child node of the third node, or a third link between child nodes of the third node; an event of link quality reduction to be likely to occur on at least one of the link between the second node and the third node, a second link between the third node and a child node of the third node, or a third link between child nodes of the third node; an event of QoS (Quality of Service) reduction occurred on at least one of the link between the second node and the third node, a second link between the third node and a child node of the third node, or a third link between child nodes of the third node; or an event of QoS (Quality of Service) reduction to be likely to occur on at least one of the link between the second node and the third node, a second link between the third node and a child node of the third node, or a third link between child nodes of the third node.

In operation 605, the second node may transmit, to a first node, second information to report the identified event. The first node may be a parent node of the second node In operation 607, the second node may receive, from the first node, third information to handle the link quality reduction on the link between the second node and the third node.

In operation 609, the second node may determine an action for mitigating the link quality reduction based on the third information. In one embodiment, the action for mitigating the link quality reduction may include at least one of action for modifying existing Logical Channel Prioritization (LCP) parameters for uplink data transfer from the second node; or action for re-routing data once received. In addition, the action for modifying existing LCP parameters for uplink data transfer from the second node may include: at least one of action for adjusting scheduling weights; or action for giving higher priority to channels where a delay is expected on the link between the second node and the third node. The action for re-routing data once received may include action for re-routing the data through a less congested route.

Certain examples of the present disclosure provide a method for resource scheduling in a network including a first node, a second node and a third node, wherein the second node is a child node of the first node and the third node is a parent node of the first node, the method comprising: determining, by the first node, that a reduction of QoS has occurred, or is likely to occur, on a link between the first node and the second node and/or for a specific channel on a link between the first node and the second node; transmitting, by the first node to the third node, information based on the determined reduction and/or anticipated reduction of QoS; and determining, by the second or third node or both, an action for mitigating the reduction of QoS.

In certain examples, determining that a reduction of QoS has occurred or is likely to occur may be based on one or more of: link status information inferred by the first node; information indicating when the first node will be able to give UL grant to the second node; information indicating the type of traffic on each of one or more channels between the first node and the second node; information indicating the validity of data coming from the second node; information indicating uplink grants received by the first node from the third node; and information of impending and/or ongoing transmission from a child node of the first node other than the second node and/or UEs attaching directly to the first node.

In certain examples, the link status information may comprises one or more of: a channel quality feedback report from the second node (e.g. indicating that retransmissions may be required); and information indicating channel quality and/or load and/or congestion on a link downstream of the second node.

In certain examples, the method may further comprise: determining, by the first node, one or more channels that have, or will be given, priority; and transmitting, by the first node to the third node, information based on determined channels.

In certain examples, the information based on the determined reduction of QoS may be transmitted based on one or more of: using one or more MAC Control Elements (CEs); using one or more MAC CEs when reporting BSR; using one or more control RLC CEs; using a BAP layer packet; if an LCH is mapped to multiple SR configurations, using one or more of the SR configurations for indicating a request for treatment modification; and if multiple grants are allowed for an LCH, using one or more of the grants for indicating a request for treatment modification.

In certain examples, the information based on the determined reduction of QoS may comprise one or more of: information indicating one or more channels requiring action for mitigating the reduction in QoS; and information indicating the type of action to perform for each channel.

In certain examples, the information indicating the type of action may include a value indicating one or more of: "expedite grant", "increase reliability", and "do nothing".

In certain examples, the action for mitigating the reduction in QoS may comprise one or more of: modifying existing LCP parameters for UL data transfer from the first node; providing reserved resources for allowing scheduling without any requests from the first node; limiting the use of certain grants to certain LCHs; modifying one or more physical layer parameters; re-routing data once received; sending feedback to the network; and imposing restrictions on a node.

In certain examples, modifying the existing LCP parameters may comprise giving higher priority to cannels where a delay is expected on the link between the first and second nodes.

In certain examples, the information based on the determined reduction of QoS may comprise information indicating channels where traffic should be dropped.

In certain examples, the information indicating channels where traffic should be dropped may be determined based on one or more of: information regarding the first node's time-to-grant for the traffic; and information regarding the number of hops that data from the second node needs to traverse in order to reach its destination.

Certain examples of the present disclosure provide a method, for a first node, for resource scheduling in a network including the first node, a second node and a third node, wherein the second node is a child node of the first node and the third node is a parent node of the first node, the method comprising: determining, by the first node, that a reduction of QoS has occurred, or is likely to occur, on a link between the first node and the second node and/or for a specific channel on a link between the first node and the second node; and transmitting, by the first node to the third node, information based on the determined reduction and/or anticipated reduction of QoS.

Certain examples of the present disclosure provide a system for resource scheduling in a network, the system comprising a first node, a second node and a third node, wherein the second node is a child node of the first node and the third node is a parent node of the first node, wherein the first node is configured to: determine that a reduction of QoS has occurred, or is likely to occur, on a link between the first node and the second node and/or for a specific channel on a link between the first node and the second node, and transmit, to the third node, information based on the determined reduction and/or anticipated reduction of QoS, and wherein the second node or the third node or both are configured to determine an action for mitigating the reduction of QoS.

Certain examples of the present disclosure provide a first node, for resource scheduling in a network including the first node, a second node and a third node, wherein the second node is a child node of the first node and the third node is a parent node of the first node, wherein the first node is configured to: determine that a reduction of QoS has occurred, or is likely to occur, on a link between the first node and the second node and/or for a specific channel on a link between the first node and the second node; and transmit, to the third node, information based on the determined reduction and/or anticipated reduction of QoS.

Certain examples of the present disclosure provide a computer program comprising instructions which, when the program is executed by a computer, cause the computer to carry out any method disclosed herein. Certain examples of the present disclosure provide a computer-readable data carrier having stored thereon such a computer program.

While the disclosure has been shown and described with reference to certain examples, it will be understood by those skilled in the art that various changes in form and detail may be made therein without departing from the scope of the disclosure, as defined by the appended claims.

ABBREVIATIONS/DEFINITIONS

In the present disclosure, the following abbreviations and definitions may be used.

3GPP $3^{rd}$ Generation Partnership Project
5G $5^{th}$ Generation
5GC 5G Core
AMF Access and Mobility Management Function
BAP Backhaul Adaptation Layer
BSR Buffer Status Report
CE Control Element
CU Central Unit
DU Distributed Unit
F1 interface between DU and CU
F1-C F1 Control information
F1*-U Modified F1-U (carried over wireless backhaul in IAB)
gNB 5G base station
GTP-U GPRS Tunnelling Protocol
IAB Integrated Access and Backhaul
IP Internet Protocol
LCG Logical Channel Group
LCH Logical Channel
LCP Logical Channel Prioritization
MAC Medium Access Control
MIMO Multiple-Input Multiple-Output
MT Mobile Termination
NG Interface between 5G RAN and Core
NGC Control part of NG
NR New Radio
PDCP Packet Data Conversion Protocol
PHY Physical
RAN Radio Access Network
Rel Release
RLC Radio Link Control
RLF Radio Link Failure
RRC Radio Resource Control QoS Quality of Service
SA mode Stand-Alone mode
SDAP Service Data Adaption Protocol
SMF Session Management Function
SR Scheduling Request
TR Technical Report
UE User Equipment
UL UpLink
UPF User Plane Function
Uu Air interface between terminal and base station/access point
X2 interface between 2 base stations

The invention claimed is:

1. A method, performed by a second node, in a wireless communication system, the method comprising:
   receiving, from a third node, first information indicating downstream status;
   identifying an event associated with link quality reduction on a link between the second node and the third node based on the first information indicating downstream status;
   transmitting, to a first node, second information to report the identified event;
   receiving, from the first node, third information to handle the link quality reduction on the link between the second node and the third node; and
   determining an action for mitigating the link quality reduction based on the third information.

2. The method of claim 1, wherein the first information indicating downstream status comprises at least one of information indicating channel quality, information indicating load, or information indicating congestion on the downstream link of the third node.

3. The method of claim 1, wherein the action for mitigating the link quality reduction comprises at least one of action for modifying existing Logical Channel Prioritization (LCP) parameters for uplink data transfer from the second node; or action for re-routing data once received.

4. The method of claim 3,
   wherein the action for modifying existing LCP parameters for uplink data transfer from the second node comprises: at least one of action for adjusting scheduling weights; or action for giving higher priority to channels where a delay is expected on the link between the second node and the third node; and
   wherein the action for re-routing data once received comprises action for re-routing the data through a less congested route.

5. The method of claim 1,
   wherein the first node is a parent node of the second node; and
   wherein the third node is a child node of the second node.

6. The method of claim 1, wherein the event associated with link quality reduction on the link between the second node and the third node comprises at least one of:
   an event of link quality reduction occurred on at least one of the link between the second node and the third node, a second link between the third node and a child node of the third node, or a third link between child nodes of the third node;
   an event of link quality reduction to be likely to occur on at least one of the link between the second node and the third node, a second link between the third node and a child node of the third node, or a third link between child nodes of the third node;
   an event of QoS (Quality of Service) reduction occurred on at least one of the link between the second node and the third node, a second link between the third node and a child node of the third node, or a third link between child nodes of the third node; or
   an event of QoS (Quality of Service) reduction to be likely to occur on at least one of the link between the second node and the third node, a second link between the third node and a child node of the third node, or a third link between child nodes of the third node.

7. The method of claim 1, wherein the first information indicating downstream status comprises downstream link quality measurement information.

8. A second node in a wireless communication system, the second node comprising:
   a transceiver; and
   at least one processor configured to:
   control the transceiver to receive, from a third node, first information indicating downstream status,
   identify an event associated with link quality reduction on a link between the second node and the third node based on the first information indicating downstream status,
   control the transceiver to transmit, to a first node, second information to report the identified event,
   control the transceiver to receive, from the first node, third information to handle the link quality reduction on the link between the second node and the third node, and
   determine an action for mitigating the link quality reduction based on the third information.

9. The second node of claim 8, wherein the first information indicating downstream status comprises at least one of information indicating channel quality, information indicating load, or information indicating congestion on the downstream link of the third node.

10. The second node of claim 8, wherein the action for mitigating the link quality reduction comprises at least one of action for modifying existing Logical Channel Prioritization (LCP) parameters for uplink data transfer from the second node; or action for re-routing data once received.

11. The second node of claim 10,
   wherein the action for modifying existing LCP parameters for uplink data transfer from the second node comprises: at least one of action for adjusting scheduling weights; or action for giving higher priority to channels where a delay is expected on the link between the second node and the third node; and
   wherein the action for re-routing data once received comprises action for re-routing the data through a less congested route.

12. The second node of claim 8,
   wherein the first node is a parent node of the second node; and
   wherein the third node is a child node of the second node.

13. The second node of claim 8, wherein the event associated with link quality reduction on the link between the second node and the third node comprises at least one of:
   an event of link quality reduction occurred on at least one of the link between the second node and the third node, a second link between the third node and a child node of the third node, or a third link between child nodes of the third node;
   an event of link quality reduction to be likely to occur on at least one of the link between the second node and the third node, a second link between the third node and a child node of the third node, or a third link between child nodes of the third node;
   an event of QoS (Quality of Service) reduction occurred on at least one of the link between the second node and the third node, a second link between the third node and a child node of the third node, or a third link between child nodes of the third node; or an event of QoS (Quality of Service) reduction to be likely to occur on at least one of the link between the second node and the third node, a second link between the third node and a child node of the third node, or a third link between child nodes of the third node.

14. The second node of claim 8, wherein the first information indicating downstream status comprises downstream link quality measurement information.

15. A computer program comprising instructions which, when the program is executed by a computer, cause the computer to carry out a method according to claim 1.

* * * * *